United States Patent
Kleer et al.

(10) Patent No.: US 6,764,384 B1
(45) Date of Patent: Jul. 20, 2004

(54) SYSTEM FOR THE PRECISION MACHINING OF ROTATIONALLY SYMMETRICAL COMPONENTS

(75) Inventors: Arno Kleer, Arnbach (DE); Rudolf Schoellner, Niederroth (DE); Stefan Karnowski, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/831,749

(22) PCT Filed: Nov. 9, 1999

(86) PCT No.: PCT/DE99/03566

§ 371 (c)(1),
(2), (4) Date: Aug. 10, 2001

(87) PCT Pub. No.: WO00/29171

PCT Pub. Date: May 25, 2000

(30) Foreign Application Priority Data

Nov. 14, 1998 (DE) .......................................... 198 52 637

(51) Int. Cl.⁷ ................................................. B24B 1/00
(52) U.S. Cl. ............................. 451/32; 451/36; 451/104
(58) Field of Search ................................. 451/326, 327, 451/328, 329, 330, 104, 106, 113, 36

(56) References Cited

U.S. PATENT DOCUMENTS

| | | | |
|---|---|---|---|
| 464,584 A | * 12/1891 | Patterson et al. | ............ 451/106 |
| 2,854,796 A | * 10/1958 | Fruth | ........................ 451/180 |
| 3,464,163 A | 9/1969 | Ferrara | |
| 3,523,834 A | * 8/1970 | Hewins | ...................... 148/6.5 |
| 3,802,129 A | * 4/1974 | Ferrara | ....................... 451/327 |
| 3,906,679 A | * 9/1975 | Riedel | ......................... 451/327 |
| 4,074,472 A | * 2/1978 | Balz | .............................. 451/32 |
| 4,241,545 A | * 12/1980 | Anderson et al. | ........... 451/327 |
| 4,428,161 A | * 1/1984 | Walther et al. | ............. 451/327 |
| 4,467,563 A | * 8/1984 | Yoder | ......................... 451/326 |
| 4,689,921 A | 9/1987 | Murate | |
| 4,706,414 A | 11/1987 | Muzik | |
| 5,375,377 A | * 12/1994 | Kenton | ......................... 451/22 |
| 6,080,052 A | * 6/2000 | Renter et al. | ................ 451/326 |
| 6,210,258 B1 | * 4/2001 | Malkin et al. | ................. 451/74 |
| 6,273,787 B1 | * 8/2001 | Gilmore et al. | ............... 451/36 |

FOREIGN PATENT DOCUMENTS

| | | |
|---|---|---|
| GB | 1067656 | 5/1967 |
| JP | 59175951 | 10/1984 |
| WO | 85/02136 | 5/1985 |

\* cited by examiner

*Primary Examiner*—Lee D. Wilson
(74) *Attorney, Agent, or Firm*—Crowell & Moring LLP

(57) ABSTRACT

An arrangement and method for precision machining of rotationally symmetrical, disk or ring-shaped components. The arrangement includes a container which is open at the top and mounted such that it is able to vibrate. An unbalanced rotor causes the container to vibrate in a rotation-induced manner and has a drive. The container is filled with an abrasive substance including a multitude of abrasive bodies and a liquid. A device for fixing the component is also arranged in the container which has a rotationally symmetrical shape and is arranged in line with a vertical axis. The container also includes a rigid fixing device for horizontally positioning the component. The upper container rim is higher than the highest areas to be machined of Arrangement for the fine machining of rotationally symmetrical disk-shaped or annular components by liquid-supported vibratory grinding, having a container, which is open at the top and is supported so that it can vibrate, having an unbalanced rotor, with drive, which puts the container into a rotationally induced shaking motion, having an abrasive filling for the container, consisting of many abrasive particles and a liquid, together with a holding device for the component.

Figure 1:
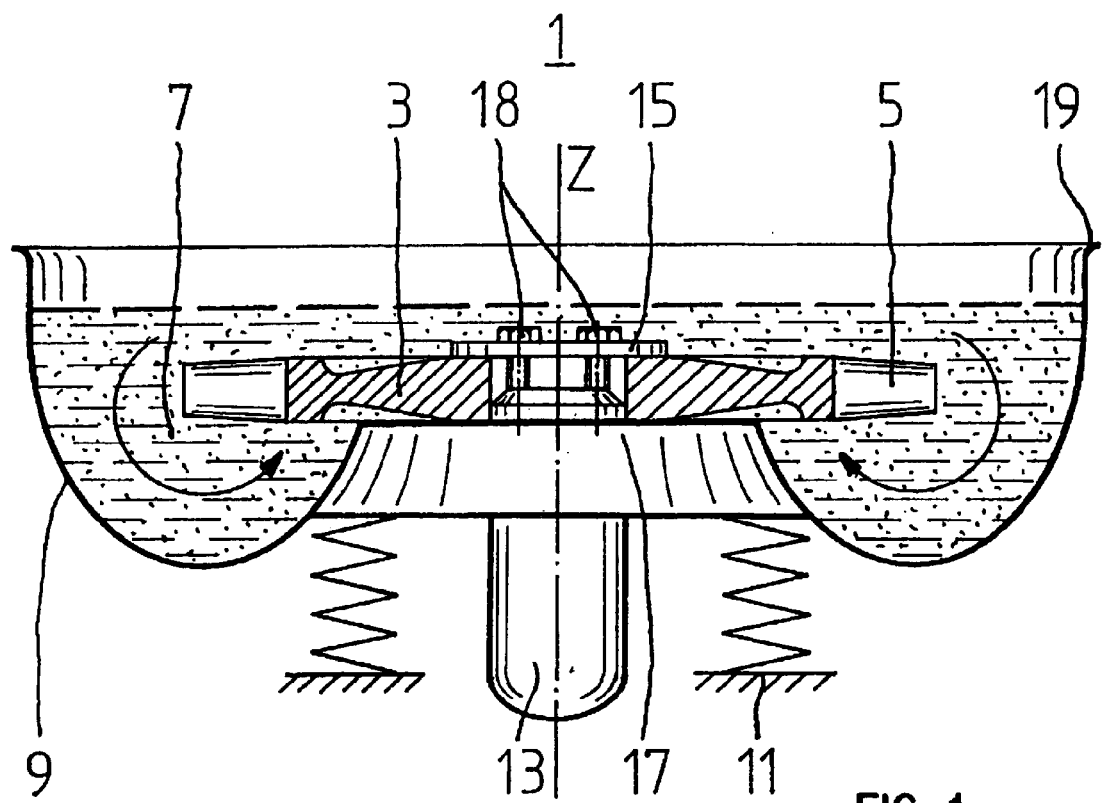

The container is of rotationally symmetrical configuration and arranged with its centre line vertical, a stiff holding device for a horizontal arrangement of the component is present in the container and the upper edge of the container is higher than the highest parts, of the component held, which have to be processed.

14 Claims, 1 Drawing Sheet

SYSTEM FOR THE PRECISION MACHINING OF ROTATIONALLY SYMMETRICAL COMPONENTS

The invention relates to an arrangement for the fine machining of rotationally symmetrical, disk-shaped or annular components by vibratory grinding, as described in the preamble to claim 1.

Current developments in the field of aircraft gas turbine engines show a clear tendency towards the use of integrally bladed rotors, particularly in the compressor region. In this respect, requirements for less weight, higher strength and less wear are decisive, thus permitting higher speeds/higher power and longer life. For the individual stages of such rotors, i.e. for integrally bladed rotor disks, the designation "blisk" derived from "bladed disk", has become general in specialist circles. In the case of larger blisks, the blades are usually manufactured separately, for example by forging or casting, and are connected to the disk by means of appropriate welding methods, for example by means of linear friction welding, the disk frequently being a forged part. Smaller to medium sized blisks are usually manufactured from the "solid", i.e. from a single blank. The disk contour can be largely generated by turning up to the point of the fine machining. The geometrically demanding blade region is preferably generated by multi-dimensional milling, although the fine surface finish and surface accuracy necessary for aerodynamic and strength reasons are not yet completely achieved ("milling lines"). For this reason, final fine machining is necessary in this case. However, even in the case of relatively large, welded blisks or other components, such as disks, guide vane rings, etc., final fine machining can be necessary or advantageous.

A promising process for this purpose is liquid-supported vibratory grinding which, in a preferred version, presents a combination of mechanical abrasion and chemical erosion (currentless, i.e. without external electricity sources). In this process, a relative motion between a multitude of loose abrasive particles and the workpiece is generated by mechanical vibrations of a container, wetting of the abrasive particles and therefore of the workpiece with a metal-dissolving, usually acid, liquid medium taking place in addition. Surfaces can be smoothed, flash removed, edges rounded, etc. by this method.

Known suppliers of this technology are the REM company and, particularly in the German area, the OSRO company. A special arrangement for the fine machining of blisks has become known from these suppliers. This uses an essentially rectangular, vibrating container with a trough-type volume open at the top for the abrasive filling. The container vibrations induced by an unbalanced rotor generate a quasi-continuous circulating motion of the abrasive filling, including a component of motion in the longitudinal direction of the "trough". The integrally bladed rotor disk, i.e. the blisk, to be machined is positioned with its centre line horizontal, transverse to the container longitudinal direction and freely rotatable at a defined height centrally over the container in such a way that it is immersed with its currently lower region within the container filling in the form of a segment, the immersion depth corresponding approximately to the radial blade height. Because of the longitudinal component of motion of the abrasive container filling mentioned, the rotor disk is put automatically into rotation in the manner of an "undershoot mill wheel", i.e. a water wheel with its lower part immersed in a flow channel, so that with each revolution, its complete bladed periphery comes into contact with the abrasive filling. A disadvantageous feature of this arrangement is the unfavourable working time to "idling time" ratio for each blade because, due to the geometry, each blade moves only "uselessly" through the air for the major part of a disk revolution. During this "air phase" only the adhering, metal-dissolving fluid acts, in a rather uncontrolled manner, on the surface. For this reason alone, a multitude of revolutions, i.e. a long processing period, is necessary before the desired surface quality is achieved. In addition, the kinematics of this "mill wheel arrangement" tend to generate relatively weak relative motions between workpiece and filling, which further lengthens the processing period. Whereas, in fact, the container itself vibrates/shakes relatively powerfully, the liquid-soaked abrasive particle filling moves, due to inertia, in the manner of a highly viscous fluid without effective vibration constituents, i.e. with a rather sluggish, directional flowing motion. Because the component/blisk is decoupled from the container and only turns slowly on its stationary holding device, there are only weak erosive relative motions overall. It should be mentioned, as an advantage of such an arrangement, that the container volume and therefore the filling volume can be minimised in relation to the component size.

On this basis, the object of the invention consists in providing an arrangement for liquid-supported vibratory grinding of rotationally symmetrical, disk-shaped or annular components, which arrangement permits much shorter throughput times for each component by optimising the erosion process and therefore operates more economically.

This object is achieved by means of the features characterized in claim 1, in association with the generic features in its preamble.

The essence of the invention is seen in the fact that the disk-shaped or annular component is arranged so that it is located horizontally in the container and is firmly/rigidly connected to the latter or, on the other hand, can be rotated about its centre line but is otherwise likewise firmly connected to the container, so that all the surfaces to be processed are continually in contact with the abrasive filling. The container shape is matched to the component and is therefore rotationally symmetrical, thus permitting a filling which covers the component. In consequence, there are no "idling times" during the processing. Because of the stiff connection of the component to the container, the former executes the same vibration motions as the latter with, if appropriate, an additional rotary motion. The filling, which is sluggish due to its inertia, is in contrast more or less at rest—apart from a slow, directional circulatory motion—so that the vibration amplitudes of container and workpiece/component are converted almost completely into abrasively effective relative motions. By this means, the desired material erosion is achieved in a substantially shorter time.

Preferred configurations of the arrangement according to the main claim are designated in the sub-claims.

Figure 2:
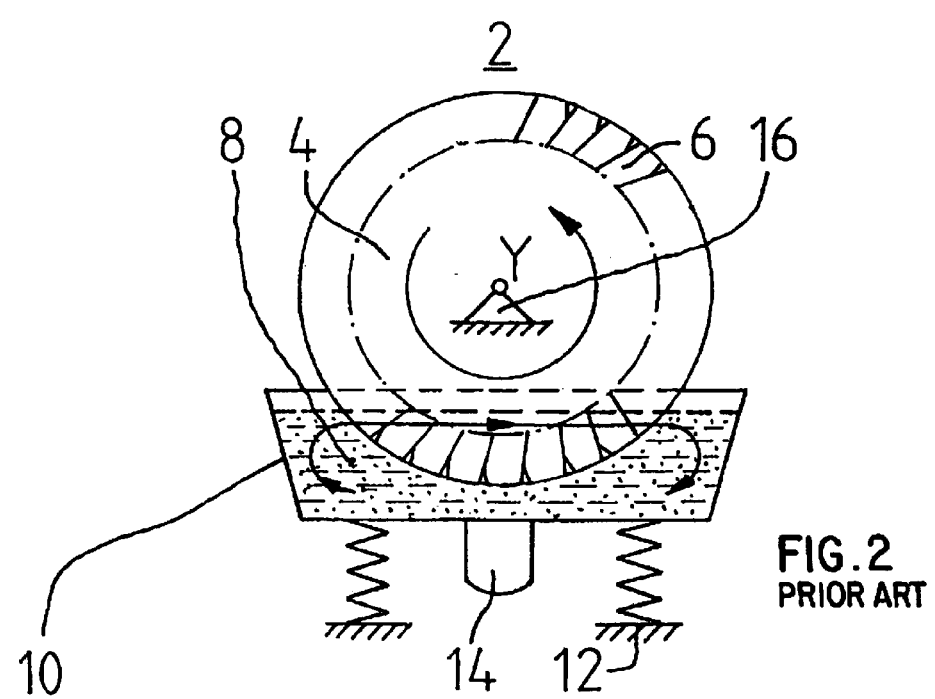

The invention—including a known solution—is explained in still more detail below using the drawings. In these, in a simplified and more diagrammatic representation:

FIG. 1 shows a—vertical—longitudinal central section through an arrangement according to the invention with a blisk as workpiece/component, FIG. 2 shows a comparable section through an arrangement according to the prior art.

The arrangement 1 can be subdivided into the component to be processed, here illustrated by a rotor disk 3 with integral blading 5, the abrasive filling 7, which is composed of a multitude of defined abrasive particles and of a liquid which wets the abrasive particles and which is in particular a metal-dissolving liquid in this case, and the container 9 which accommodates and supports the elements mentioned above. The container 9 has—at least substantially—a rotationally symmetrical configuration and is arranged horizontally, i.e. with the centre line Z vertical, its support arrangement 11 permitting limited horizontal and vertical vibrational motions. These motions are generated by an unbalanced rotor, with drive 13, which is arranged coaxially on the bottom of the container. Inside the container, there is a central elevation 17, which supports the horizontally located rotor disk 3 and is therefore part of its holding device 15. The holding device 15 should be rigid in relation to the container 9, which is here achieved inter alia by a screw connection 18, so that the bladed rotor disk executes the same vibrational/wobbling motions as the container 9. The abrasive filling 7 should be at least sufficiently high in the container 9 for the workpiece surfaces to be processed to be completely covered. The fine machining usually applies to the blading 5 and, if necessary, to the transition region from the blades to the rotor disk 3. The inner shape of the container is also selected in such a way that the blading 5 is embedded on all sides in a sufficient volume of abrasive filling 7. The arrows within the filling 7 indicate that, as a consequence of the container vibration, a rather slow, directional and continuous flowing motion occurs here in the form of an endless helical line which extends concentrically about the centre line Z, i.e. helically curved and closed. It has already been mentioned that the sluggish filling cannot follow the rapid vibration motions of the container and workpiece in its totality. Apart from its sluggish flowing motion, the filling 7 is more at less at rest as compared with the vibrating rotor disk 3 which maximises, in an advantageous manner, the relative motion and therefore the material erosion.

It should also be noted that the upper container rim, which limits the filling height, is designated by 19.

The stiff/rigid fastening of the component in the container can be modified in such a way that a free or motorised rotation is possible about the component centre line (one degree of freedom) but this does not alter anything with respect to the vibrational and wobbling motion in conformity with the container. A modification with additional rotation is—because it is easily comprehensible—not shown.

FIG. 2 shows, in contrast, an arrangement 2 according to the prior art, which can be aptly designated as "mill wheel arrangement" or "water wheel arrangement".

A trough-type container 10 may be seen which—in the view from above—has an elongated, for example rectangular, shape. Here again, a bearing arrangement 12 capable of vibration and an unbalanced rotor with drive 14 are present in order to put the container 10 into a defined vibrational motion. A spatial, continuous flowing motion occurs in the abrasive filling 8, of which motion only the component in the container longitudinal direction— substantially from left to right in the present illustration—is indicated by arrows. A rotor disk 4 with blading 6 is partially immersed from above in the filling 8, a holding device 16 permitting free rotation of the rotor disk 4 about its horizontally located centre line Y. The holding device 16 is mechanically decoupled from the container 10 so that the rotor disk 4 only rotates slowly but does not vibrate. The rotational motion follows automatically from the flowing motion of the filling 8 acting as drive (water wheel principle). Because, de facto, neither the workpiece nor the abrasive filling is vibrating, only a very slow and rather ineffective relative motion is here decisive for the processing.

It should finally be noted that although blisks represent the preferred components for the fine machining in question, a large number of other, rotationally symmetrical components can also be processed with an arrangement according to the invention. This can involve both rotating components, such as "conventional" rotor disks with positive blade fixing or sealing elements, and static components, such as guide vane rings, casing parts, etc.

What is claimed is:

1. An arrangement for a fine machining of a component by vibratory grinding comprising:

the component;

a container comprising an opening;

an abrasive filling held by the container and comprising a plurality of abrasive particles and at least one of a physically active liquid and a chemically active liquid;

a support arrangement supporting the container such that the container is vibratable;

an unbalanced rotor having a drive operatively arranged to place the container into a rotationally-induced shaking motion comprising a defined amplitude and frequency; and a holding device immovably fastening the component relative to the container, the component being fastened horizontally within the container such that the component is at least partially immersed in the abrasive filling at regions to be processed;

wherein the container comprises a substantially rotationally symmetrical configuration and is arranged with a center line extending vertically, a peripheral upper container edge of the container being arranged at a height which is above the component when the component is fastened by the holding device within the container.

2. The arrangement according to claim 1, wherein the holding device comprises a closed, central elevation which extends upwards from a bottom of the container, and the unbalanced rotor and drive being arranged on the bottom of the container coaxially with the center line thereof.

3. The arrangement according to claim 1, wherein the component is fastened to the container by at least one screw connection.

4. The arrangement according to claim 1, herein the holding device for the component is arranged to provide a free and/or a motor-driven rotational motion.

5. The arrangement according to claim 1, wherein the component is rotationally symmetrical, disk-shaped or annular.

6. The arrangement according to claim 5, wherein the component is a rotor disk comprising integral blading.

7. An arrangement for a fine machining of a component by vibratory grinding comprising:

a container comprising an opening;

an abrasive filling held by the container and comprising a plurality of abrasive particles and at least one of a physically active liquid and a chemically active liquid;

a support arrangement supporting the container such that the container is vibratable;

an unbalanced rotor having a drive operatively arranged to place the container into a rotationally-induced shaking motion comprising a defined amplitude and frequency; and a holding device for fastening the component horizontally within the container with one degree of freedom of movement relative to the container, the one degree of freedom of movement defined by a rotational center line of the component, the component being fastened within the container such that the component is at least partially immersed in the abrasive filling at regions to be processed;

wherein the container comprises a substantially rotationally symmetrical configuration and is arranged with a center line extending vertically, a peripheral upper container edge of the container being arranged at a height which is above the component when the component is fastened by the holding device within the container.

8. The arrangement according to claim 7, wherein the holding device comprises a closed, central elevation which extends upwards from a bottom of the container, and the unbalanced rotor and drive being arranged on the bottom of the container coaxially with the center line thereof.

9. The arrangement according to claim 7, wherein the component is fastened to the container by at least one screw connection.

10. The arrangement according to claim 7, wherein the holding device for the component is arranged to provide one of a free and a motor-driven rotational motion.

11. The arrangement according to claim 7, wherein the component is rotationally symmetrical, disk-shaped or annular.

12. The arrangement according to claim 11, wherein the component is a rotor disk comprising integral blading.

13. A method for fine machining a component by vibratory grinding comprising:

arranging a container having a substantially rotationally symmetrical configuration such that a center line extends vertically;

providing the container with an abrasive filling, the abrasive filling comprising a plurality of abrasive particles and at least one of a physically active liquid and a chemically active liquid;

fastening the component immovably relative to the container with a holding device such that the component is arranged horizontally within the container and is at least partially immersed in the abrasive filling at regions to be processed, a peripheral upper edge of the container being arranged at a height which is above the component;

supporting the container with a support arrangement which allows the container to vibrate; and providing a rotationally-induced shaking motion to the container by rotating an unbalanced rotor with a drive, the rotationally-induced shaking motion comprising a defined amplitude and frequency.

14. A method for fine machining a component by vibratory grinding comprising:

arranging a container having a substantially rotationally symmetrical configuration such that a center line extends vertically;

providing the container with an abrasive filling, the abrasive filling comprising a plurality of abrasive particles and at least one of a physically active liquid and a chemically active liquid;

fastening the component horizontally within the container with a holding device with one degree of freedom of movement relative to the container, the one degree of freedom of movement defined by a rotational center line of the component, the component being at least partially immersed in the abrasive filling at regions to be processed and a peripheral upper edge of the container being arranged at a height which is above the component;

supporting the container with a support arrangement which allows the container to vibrate; and providing a rotationally-induced shaking motion to the container by rotating an unbalanced rotor with a drive, the rotationally-induced shaking motion comprising a defined amplitude and frequency.

* * * * *